United States Patent [19]

Diem et al.

[11] Patent Number: 4,470,537
[45] Date of Patent: Sep. 11, 1984

[54] SOLID STATE BONDING OF CERAMIC AND METAL PARTS

[75] Inventors: Wolfgang Diem; Gerhard Elssner, both of Stuttgart, Fed. Rep. of Germany

[73] Assignee: Max-Planck-Gesellschaft zur Forderung der Wissenschaften e.V., Goettingen, Fed. Rep. of Germany

[21] Appl. No.: 405,003

[22] Filed: Aug. 4, 1982

[30] Foreign Application Priority Data

Aug. 4, 1981 [DE] Fed. Rep. of Germany ....... 3130765

[51] Int. Cl.$^3$ .............................................. B23K 20/22
[52] U.S. Cl. ..................................... 228/193; 228/903
[58] Field of Search ........... 228/263.12, 193, 194–195, 228/903

[56] References Cited

U.S. PATENT DOCUMENTS 3,333,324 8/1967 Roswell et al. ..................... 228/193
3,666,429 5/1972 Campbell et al. .......... 228/263.12 X
3,737,977 6/1973 Jorgensen .......................... 228/903
3,795,041 3/1974 Hennicke ...................... 228/194 X
4,050,956 9/1977 de Bruin ....................... 228/193 X
4,324,356 4/1982 Blair .................................... 228/193

Primary Examiner—Kenneth J. Ramsey
Attorney, Agent, or Firm—Flynn, Thiel, Boutell & Tanis

[57] ABSTRACT

For solid state bonding, the faces of ceramic and metal parts to be bonded are placed together, acted upon by a gage pressure if desired, and are heated to a bonding temperature which is under their melting temperatures so that an inbetween or intermediate layer is formed between the two parts. For increasing the bond strength the metal used is one undergoing a phase transition on cooling down from the bonding temperature, the phase in existence at the bonding temperature having a smaller volume than the phase stable at room temperature, so that the decrease in the volume of the metal as dependent on the coefficient of thermal expansion is balanced at least to some degree by the volume change on phase transition.

11 Claims, 4 Drawing Figures

SOLID STATE BONDING OF CERAMIC AND METAL PARTS

FIELD OF THE INVENTION

The present invention relates to solid state bonded structures made up of a metal part and a ceramic part, and to a solid state bonding process, in which faces of the metal and ceramic parts are placed together, and if desired are acted upon by pressure, and are heated to a bonding temperature which is below the melting temperature of the metal and the ceramic material so that by diffusion and/or chemical reaction the two faces of the two parts are bonded together, an inbetween layer being formed between them.

BACKGROUND OF THE INVENTION

Metal parts have to be strongly bonded to ceramic parts in a great number of different fields of technology, as for example in the construction of gas turbines, in solar energy technology, for artificially producing teeth, for high temperature electrolysis or for producing ceramic armoring structures. While it is true that solid state bonding may be used for these purposes and at the bonding temperature a strong bond is produced, it has been seen from experience that in systems of solid state bonding designed so far, the bond strength is generally low or, putting it differently, even small loading forces are responsible for damage to the bonded structure.

SUMMARY OF THE INVENTION

On the footing of the general idea that such low strength is caused by the very different coefficients of thermal expansion of ceramic materials and metals, so that high inner stresses are produced at the interface, one purpose of the present invention is that of increasing the strength of such bonded metal/ceramic structures.

For effecting this purposes, the metal part is made of a metal which has different crystalline phases at different temperatures, that is to say there is a temperature-dependent phase transition, a phase which is in existence at a temperature higher than room temperature having a smaller volume than a further phase which is stable at room temperature, the bonding temperature being within the temperature range of the phase with the smaller volume so that on cooling down of the bonded structure from the bonding temperature to room temperature the thermal decrease in volume of the metal is, at least to some degree, balanced by the increase in volume due to phase transition.

In this way the thermal decrease in volume may be balanced to a high degree by the increase in volume due to the phase transition so that, on cooling down, the changes in size of the metal part and the ceramic part will be generally of the same order and for this reason there will be a decrease in the internal stresses of the structure, this in turn being responsible for a higher bond strength.

It is best for the material used for making the bonded structure to be such that the coefficient of thermal expansion of the ceramic material, the coefficient of thermal expansion of the metal and the increase in volume of the metal produced on cooling down by the phase transition, of the metal, are so matched that the difference between the thermal decrease in volume of the metal and the phase transition increase in volume of the metal are roughly speaking equal to the thermal decrease in volume of the ceramic material.

Because of different properties of the materials such as the lattice structure, the modulus of elasticity etc. of ceramic materials and metals, there will be an anisotropic stress condition after bonding and cooling down within the bonded structure, such condition being able to be worked out by calculation or measured physically, for example using photoelasticity. This stress condition is a function of the thickness of the metal part at the bond, and of other properties. In this respect, with an increase in thickness of the metal part there is a change in the position of the greatest inner mechanical strain, which shifts in direction from the metal part through the inbetween layer into the ceramic part. The strength of the bonded structure of the present invention may be further increased by keeping the thickness of the metal part in the region of the bond greater than a lower limit, over which the direction in which there is the greatest inner mechanical strain is toward the ceramic part, such direction being the direction of the greatest main stress of the anisotropic stress condition produced after cooling down. On making such a selection of the metal thickness, the bonding strength between the metal part and the ceramic part will be greater than the strength of the ceramic material, that is to say the greatest outer or external load supporting capacity of the bonded structure will only be dependent on the ceramic material. The reasons for this will now be made clear.

It has been seen from tests that in the case of solid state bonded (or welded) metal-ceramic compound structures, fine hairline or hair cracks are formed on cooling down, such cracks decreasing inner stresses at the bond. On using a metal which undergoes a phase transition with an increase in volume on cooling down, such hair cracks, starting from points inside the metal, come to an end short of the bonded face of the ceramic part without being dependent on the metal thickness. If now the position at which there is the greatest inner mechanical strain is in the metal part, when an outside load takes effect such hair cracks will make a large or macro crack more likely (which would be the cause of the material being fractured) the macro crack, running at approximately a right angle to the direction of the greatest main stress. If on the other hand, by changing the thickness of the metal part, the direction of the greatest inner (or internal) strain is changed in position so as to be into the ceramic part (where there are no hair cracks) hair cracks will be of no effect on the fracturing properties and the bonded structure may be loaded right up to the fracture resistance of the ceramic material.

On using a metal without any phase transition, no such increase in strength was to be noted on moving the direction of the greatest inner strain into the ceramic part, because in this case, with an increase in the thickness of the metal, hair cracks will be present in the ceramic part as well, such cracks making fractures more likely.

A metal which may be used in the invention is zirconium, which undergoes transition on cooling at 862° C. from the cubic space-centered beta-phase into the hexagonal alpha-phase which has a greater volume than the beta-phase. In this case a bonding or welding temperature between 1150° and 1200° C. may be used. Furthermore, hot-pressed silicon nitride may be used as a ceramic material. In the case of a bonded structure made up of hot-pressed silicon nitride and zirconium, whose lattice structure on cooling is changed over from the beta phase into the alpha phase, it may be seen that the lower thickness limit for the metal part at the bond (above which the position of the greatest inner stress is in the ceramic part) has a value of greater than about 0.6 mm.

The process as noted may furthermore be used for producing a ceramic material-to-ceramic material bond by bonding the two ceramic parts to a metal part therebetween.

A structure produced by solid state bonding in the invention may be characterized in that between room temperature and the bonding temperature the metal has a phase transition point and the room temperature phase has a greater volume than the phase in existence at the bonding temperature.

BRIEF DESCRIPTION OF THE DRAWINGS

In the figures the reader will see a view of a bonded structure produced in the invention and a graph of readings with respect thereto. In particular.

DETAILED DESCRIPTION

Figure 1:
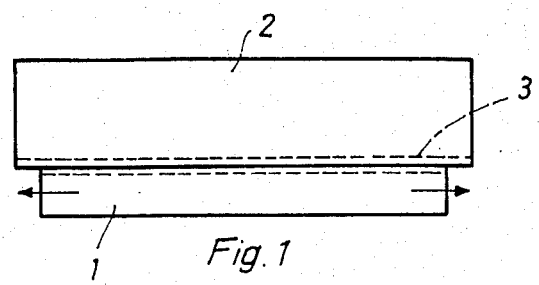
FIGS. 1 and 2 are side views of a bonded structure, made up of a metal part and a ceramic part, as seen diagrammatically.

The bonded or compound structure to be seen in FIG. 1 is made up of a metal part 1 and a ceramic part 2 which are solid state bonded together, the bonding or welding temperature producing an inbetween (or intermediate) layer 3 which is the result of diffusion and/or chemical reactions and is responsive for the joint or bond, such inbetween layer 3 being marked in chained lines. Because metals have a higher coefficient of thermal expansion than ceramic materials, there is a greater decrease in the size of the metal part when the bonded structure is cooled down from the bonding or welding temperature to room temperature than is the case with the ceramic part, this being made clear in FIG. 1 diagrammatically inasfar as the metal part 1 will be seen to have a smaller breadth. The inner (or internal) stresses produced by this and which may be responsible for cracking or breaking of the bonded structure are to be kept as small as possible, this being done in the invention by making the metal part 1 of the new bonded structure of a metal which has a phase transition point somewhere between room temperature and the bonding temperature, the phase which is in existence at room temperature having a greater volume than the phase in existence at the bonding temperature. Because of this there is an increase in volume of the metal part on being cooled down due to the phase transition so that the effect of the different volume decreases due to the different coefficients of thermal expansion of metal and ceramic is balanced somewhat, that is to say made less important. This is made clear diagrammatically by the outwardly pointing arrows in FIG. 1. It will be clear that by the use of such a metal in the bonded structure lower inner stresses will be produced so that the strength will go up.

The best effects are produced if the difference between the change in size of the metal 1 due to the coefficient of thermal expansion and a change in volume taking place due to the phase transition of the metal 1 is generally speaking equal to the change in size of the ceramic part 2 as dependent on the coefficient of thermal expansion of the ceramic material.

In the present working example the ceramic part 2 is made of hot-pressed silicon nitride and the metal part is made of zirconium, whose hexagonal phase with a greater volume is stable below 862° C. and whose cubic space centered phase with a smaller volume is stable at a higher temperature. On bonding these two materials a bonding temperature of for example between 1150° C. and 1200° C. is used, the faces of the two parts being first cleaned and then pushed together by a pressure of for example 10 N/mm$^2$, the operation best being undertaken in a vacuum.

Figure 2:
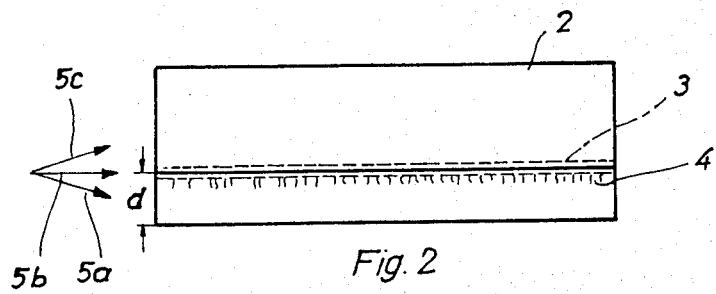

It will be seen in FIG. 2 that hairline or hair cracks 4 have been formed in the bonded structure running out from the inner part of the metal part 1 and coming to an end short of the ceramic part 2 at the inbetween or bonding layer 3. Because of the coming into existence of such hair cracks 4, stresses produced on cooling are decreased. In this respect, independently of the thickness d of the metal part 1, the hair cracks 4 are limited to the metal part.

Furthermore in FIG. 2 arrows 5a, 5b and 5c are used for indicating (for different thicknesses of the metal part) the direction of the greatest main stress of the anisotropic stress condition produced after cooling down, which direction is dependent on the thickness of the layer and may be worked out by calculation or measured experimentally. Such direction gives in each case the position of the greatest inner mechanical strain, which with an increase in the thickness d of the layer-like metal part 1 undergoes a continuous change in position from being directed into the metal part (arrow 5a) through a position directed into the inbetween layer 3 (arrow 5b) and into a position directed into the ceramic part 2 (arrow 5c). On the bonded structure being acted upon by a great enough force, for example by a pulling force at a right angle to the interface between the metal part and the ceramic part, a large or macro crack will be produced normal to the greatest or maximum main stress direction. If the position of the greatest inner strain is into the ceramic part 1, that is to say if the direction of the greatest main stress (arrow 5a) is pointing into the ceramic part, hair cracks 4 will have the effect of supporting the growth of the macro crack so that there will be a fracture at a generally early stage. For this reason it is best for the metal part 1 to have such a thickness d in the region of the bond (that is to say along the ceramic-metal interface) that the direction, dependent on this thickness, of the greatest inner mechanical strain is into ceramic paart 2, which is free of hair cracks. In this case the high strength of the ceramic material may be fully profited from.

Figure 3:
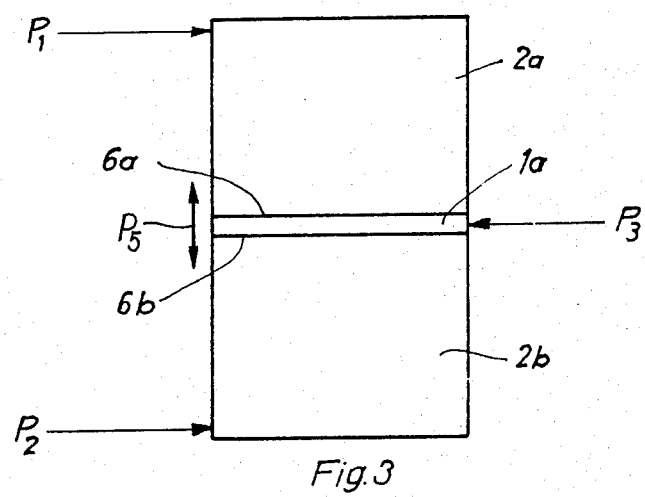
FIG. 3 illustrates a technique for measuring the bonding strength at the metal-ceramic joint, again in a diagrammatic form.
Figure 4:
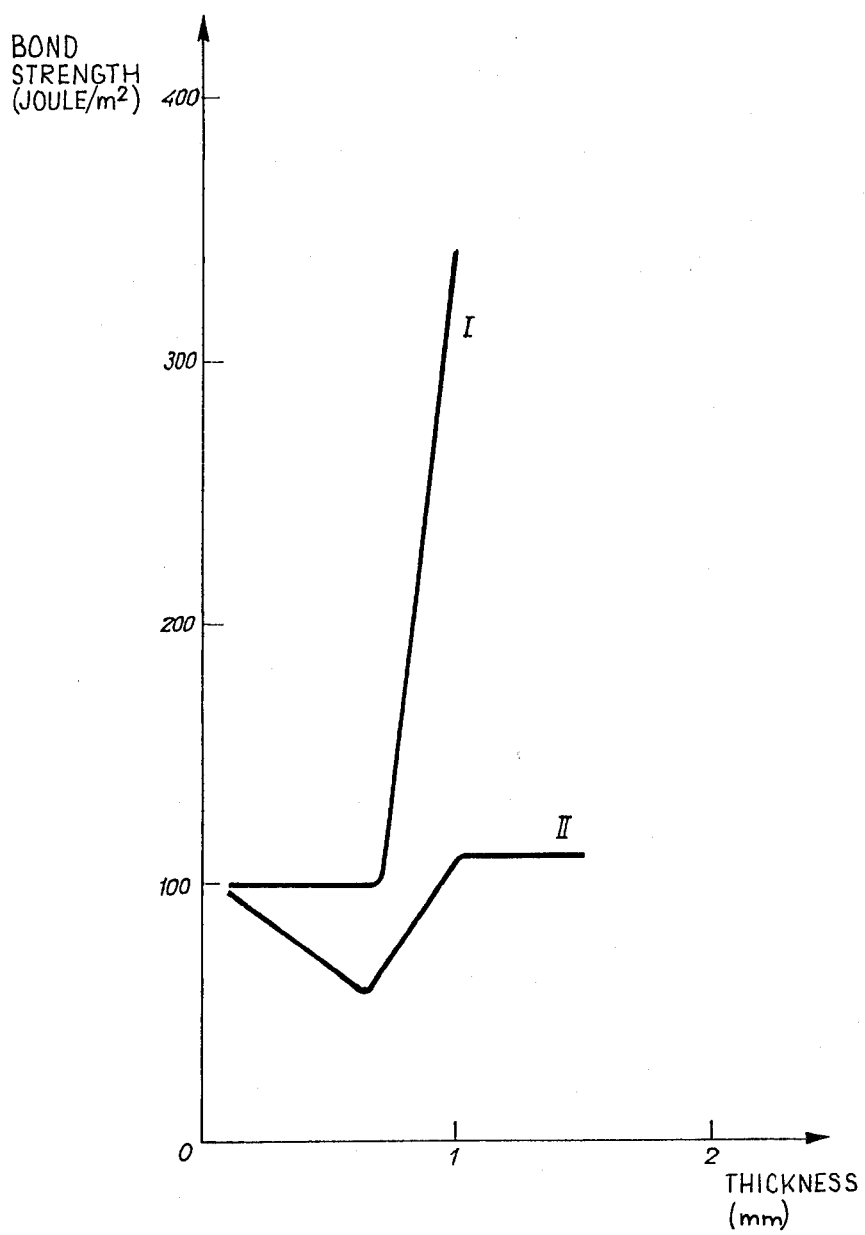
FIG. 4 is a graph giving changes of bond strength as dependent on the thickness of the metal part.

The bond strength may be measured (see FIG. 3) for example by bonding separate ceramic parts 2a and 2b on both sides of a layer-like metal part 1a and causing forces $P_1$ and $P_2$ to take effect on one side of the sandwich-like body so produced at its outer ends parallel to interfaces 6a and 6b, while on the other side of the sandwich-like structure, at the metal layer 1a, force $P_3$ is caused to take effect in the middle. This loading effect is responsible, at the side of forces $P_1$ and $P_2$, for a pulling force $P_5$ at a right angle to interfaces 6a and 6b. The bond strength measured on these lines has been plotted in FIG. 4 as a function of the layer thickness d of the metal part, curve I being representative of the bond strength of a bonded structure made up of two silicon nitride layers 2a and 2b on the outer sides of a zirconium layer 1a therebetween, the bond having been produced at a temperature greater than the phase transition temperature of zirconium. Up to a layer thickness of the metal of about 0.6 mm there is a generally unchanging bond strength of about 100 Joule/m$^2$, but at values greater than this thickness there is a sharp increase in the bond strength which goes up to about 330 Joule/m$^2$ at a layer thickness of about 1 mm. This sharp increase may be seen to take place with a change-over of the position at which there is the greatest inner strain out of the metal and into the ceramic material or, putting it somewhat differently, on movement of the direction of the greatest main stress away from the hair cracks 4. On the other hand, on producing the bonded structure under the same conditions of testing but using a metal (in place of zirconium) which on cooling down from the bonding temperature does not undergo any phase transition, as for example hafnium, the curve II will be produced, from which it will be seen that in this case the bond strength hardly gets greater than 100 Joule/m$^2$, even on using thicker metal layers. The reason for this may be seen to be the hair cracks produced here in the ceramic material as well.

The embodiments of the invention in which an exclusive property or privilege is claimed are defined as follows:

1. A solid state bonding process for producing a bond between a metal part and a ceramic part, comprising the steps of selecting as the material of said metal part a metal which has first and second crystalline phases which are respectively stable within first and second temperature ranges, wherein said first temperature range is higher than room temperature and includes a bonding temperature which is below the melting temperatures of said metal and ceramic parts, wherein said second temmperature range is lower than said bonding temperature and includes room temperature, and wherein said metal undergoes an increase in volume when cooled due to a crystalline reconfiguration during a transition from said first crystalline phase to said second crystalline phase; thereafter placing surfaces of said metal part and said ceramic part together; thereafter heating said parts to said bonding temperature, which causes a bonding layer to be produced therebetween; and thereafter cooling said metal and ceramic parts from said bonding temperature to room temperature, said increase in volume of said metal part due to said crystalline reconfiguration during said cooling offsetting in part the decrease in volume of said metal part due to the coefficient of thermal expansion thereof.

2. The process as claimed in claim 1, including the step of selecting the material of said metal part and the material of said ceramic part so that, during said step of cooling said metal and ceramic parts from said bonding temperature to room temperature, the difference between the decrease in the volume of said metal part due to its coefficient of thermal expansion and the increase in the volume of said metal part due to said crystalline reconfiguration is approximately equal to the decrease in the volume of said ceramic part due to its coefficient of thermal expansion.

3. The process as claimed in claim 1 or claim 2, wherein said step of cooling down said metal and ceramic parts produces an anisotropic stress condition therein having a greatest inner mechanical strain which acts in a direction dependent on a thickness of said metal part in the region of said bonding layer, said greatest inner mechanical strain being directed into said ceramic part when said thickness of said metal part is greater than a predetermined value; and including the step of selecting said thickness of said metal part to be greater than said predetermined value.

4. The process as claimed in claim 1 or claim 2, wherein said material selected for said metal part is zirconium.

5. The process as claimed in claim 1 or claim 2, wherein said bonding temperature is between 1150° C. and 1200° C.

6. The process as claimed in claim 1 or claim 2, wherein said ceramic material is hot-pressed silicon nitride.

7. The process as claimed in claim 1 or claim 2, wherein said metal part has a thickness greater than 0.6 mm in the region of said bonding layer.

8. The process as claimed in claim 1 or claim 2 including, during said heating and cooling steps, the step of pressing said metal and ceramic parts together with a predetermined pressure.

9. The process as claimed in claim 1 or claim 2, wherein said heating step produces said bonding layer through diffusion of said metal and ceramic parts.

10. The process as claimed in claim 1 or claim 2, wherein said heating step produces said bonding layer through a chemical reaction of said metal and ceramic parts.

11. The process as claimed in claim 1 or claim 2, wherein two said ceramic parts are provided, and wherein said placing step includes the step of placing a surface on each said ceramic part against a respective one of two surfaces provided on opposite sides of said metal part.

* * * * *